(12) United States Patent
Aoki et al.

(10) Patent No.: US 7,038,638 B2
(45) Date of Patent: May 2, 2006

(54) DISPLAY APPARATUS FOR A VEHICLE

(75) Inventors: Kunimitsu Aoki, Shizuoka (JP); Go Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 284 days.

(21) Appl. No.: 10/394,243

(22) Filed: Mar. 24, 2003

(65) Prior Publication Data

US 2003/0214474 A1 Nov. 20, 2003

(30) Foreign Application Priority Data

May 15, 2002 (JP) ............................. 2002-139992

(51) Int. Cl.
*G09G 5/00* (2006.01)
(52) U.S. Cl. .......................................... 345/7; 345/102
(58) Field of Classification Search ................ 345/7, 345/8, 102; 348/115; 359/630, 631
See application file for complete search history.

(56) References Cited

U.S. PATENT DOCUMENTS 4,711,544 A * 12/1987 Iino et al. ..................... 345/7
4,973,942 A * 11/1990 Iino ................................ 345/7

FOREIGN PATENT DOCUMENTS

JP 4-54020 12/1992

OTHER PUBLICATIONS

RD 439048, Nov. 2000, Anonymous.*

* cited by examiner

*Primary Examiner*—Regina Liang
(74) *Attorney, Agent, or Firm*—Armstrong, Kratz, Quintos, Hanson & Brooks, LLP

(57) ABSTRACT

A display apparatus for a vehicle is capable to change a display condition to display information for driving in a field of a front view of a driver. The display apparatus for a vehicle, installed in a dashboard of the vehicle for displaying a virtual image of the information in a field of front view of a driver by projecting the information displayed on an LCD illuminated by a lighting device on a member of projection disposed at an outside of the dashboard, includes display-size change means 4 for changing a display size of the LCD 3 and illuminating-area change means 20*a* for changing illuminating area in accordance with the changed display size interlockingly with said display-size change means.

19 Claims, 13 Drawing Sheets

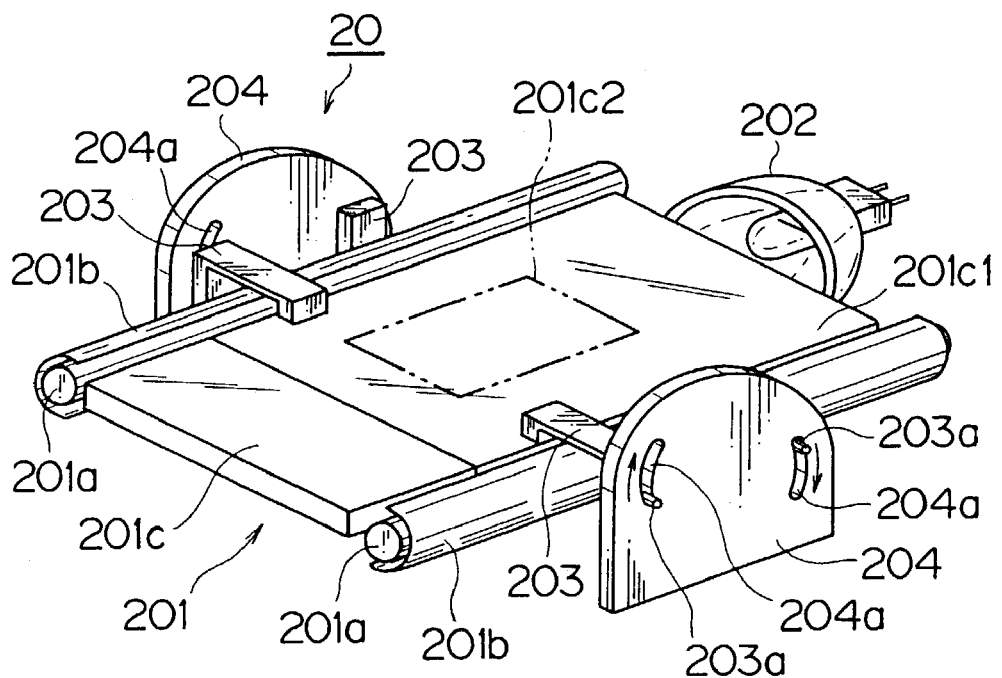
F I G. 4
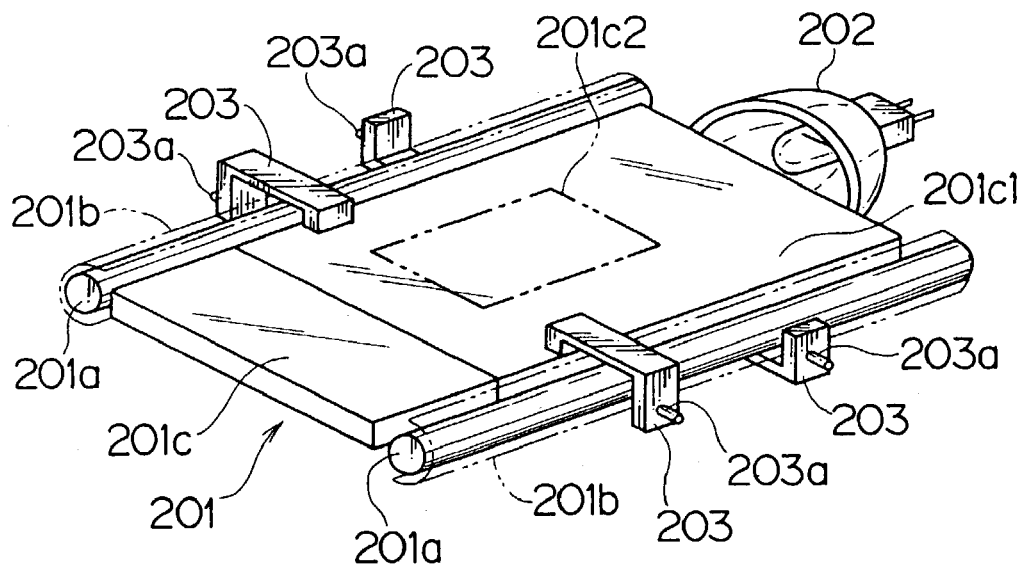
F I G. 5

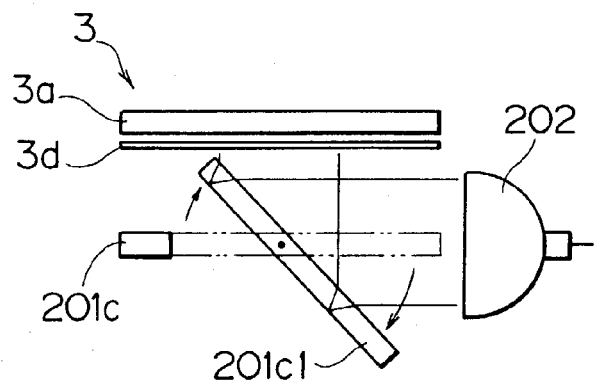
F I G. 6
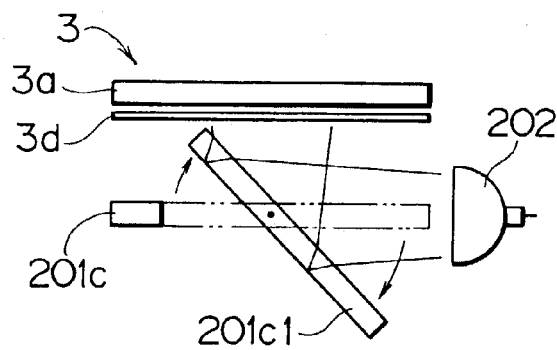
F I G. 7
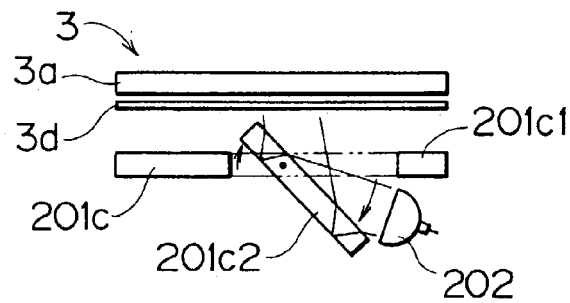
F I G. 8 A
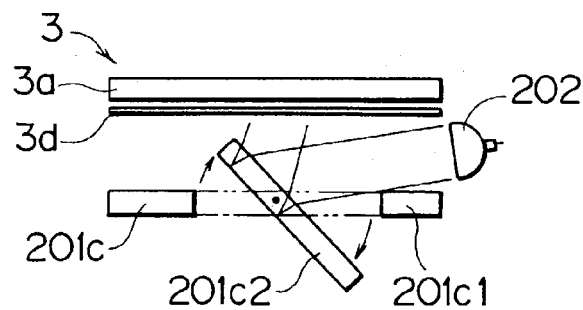
F I G. 8 B

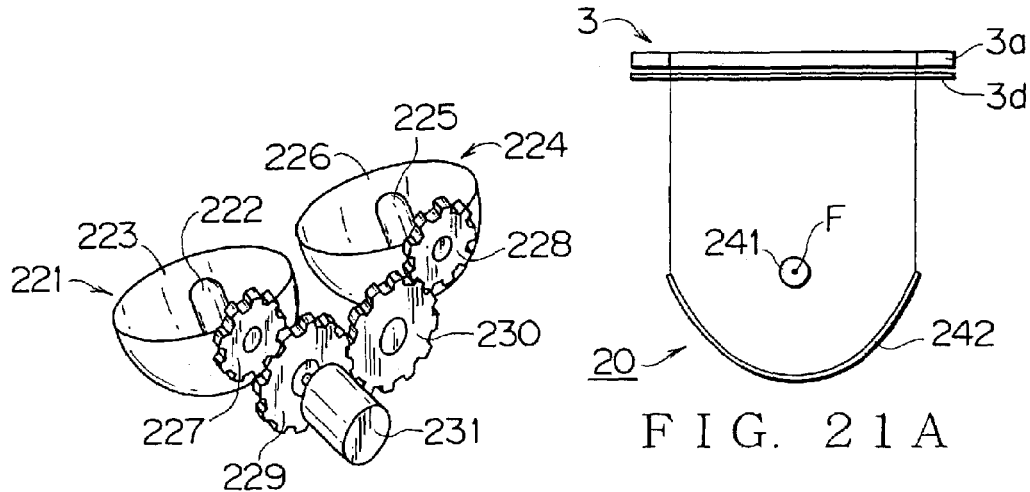
FIG. 20A
FIG. 21A
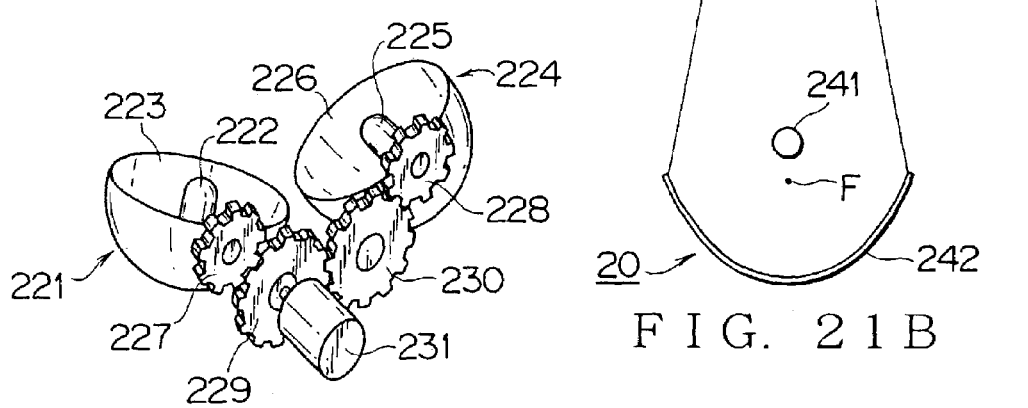
FIG. 20B
FIG. 21B
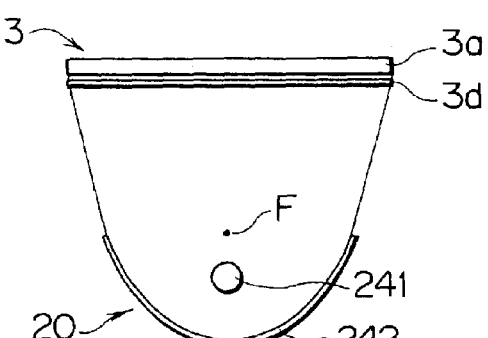
FIG. 21C

DISPLAY APPARATUS FOR A VEHICLE

BACKGROUND OF THE INVENTION

1. Field of the Invention

This invention relates to a display apparatus for a vehicle, installed in a dashboard of the vehicle and displays a virtual image of information of the vehicle within a field of front view of a vehicle driver by projecting the information of the vehicle displayed on an image plane of an LCD illuminated by a lighting device on a windshield or a combiner disposed at an outside of the dashboard.

2. Description of the Related Art

This kind of the display apparatus for the vehicle, called a head up display (HUD), is applied to display auxiliary information for driving in a filed of a front view, as disclosed in J.U.M Application Laid-open H4-54020, and has a feature to recognize auxiliary information without moving eye point during driving.

FIG. 28 shows an outline drawing of a usual display apparatus for the vehicle as mentioned above. A virtual image 10 of a speed meter is displayed on a windshield 2 located above an instrument panel 2a of a vehicle 1.

FIG. 29 shows a structure for displaying the virtual image 10. The instrument panel 2a is provided inside thereof with a convex lens 5, LCD (Liquid Crystal Display) 3, a light source 6 and an LCD drive circuit 4. The LCD 3 is disposed on a focal point of the convex lens 5. The light source 6 is disposed behind a semi-transparent mirror 12 at opposite side against the convex lens 5 regarding the LCD 3.

The LCD 3 includes a display plate 3a, a negative-positive image switching plate 3b and a polarizing plate 3c. The LCD 3 is connected to the LCD drive circuit 4 connected to a car speed sensor 13.

The light source 6 has a high brightness lamp 6a and a low brightness lamp 6b those are separated by the semi-transparent mirror 12 in a lamp case 14. Each light of the lamps 6a, 6b enters respectively from a bottom side of the LCD 3 into the convex lens 5 by the semi-transparent mirror 12. A negative-positive image select switch 15 is connected between the negative-positive image switching plate 3b and the LCD drive circuit 4. A lamp select switch 16 is connected between the high brightness lamp 6a and the low brightness lamp 6b. The both select switches 15, 16 are switched interlockingly with a side lamp switch 17 of the vehicle.

According to above structure, a display image Q is generated on the LCD 3 by converting a signal of the car speed sensor 13 to an LCD drive signal in the LCD drive circuit 4. A polarizing direction of the polarizing plate 3c attached on the bottom side of the LCD is selected so as to show the display image Q by a negative image in the field of the front view as FIG. 30A. In the daytime, the high bright lamp 6a is turned ON at the same time when the LCD displays an image. Light of the high brightness lamp reflected in the lamp case 14 is reflected at the semi-transparent mirror 12 to illuminate the display image Q of the LCD 3 and goes through the convex lens 5. The light is reflected on the windshield 2 so as to display the negative image (virtual image 10) in the front view as shown in FIG. 30A.

In the nighttime, the side lamp 17 is turned ON and the light source 6 is selected to the low brightness lamp 6b by the lamp select switch 16. Simultaneously, the negative-positive image select switch 15 is turned ON and the virtual image 10 in the front view is switched to the positive image as shown in FIG. 30B. This selection of images is done by driver's judgement.

Objects to be Solved

The head up display is required to select display only for nighttime other than common display for daytime and nighttime. The display only for nighttime may be an image by a night vision camera or an image processed the image by the night vision camera. When such image is displayed, a display condition, such as a display size or display brightness, may be different from the common display (for daytime) preferably to be seen easily by the driver.

In the above-mentioned usual display apparatus for a vehicle, the display size of the virtual image in the front view is the same in the daytime and the nighttime, and cannot change the display size as occasion demands.

To overcome the above drawback of a usual display apparatus for a vehicle, one object of this invention is to provide a display apparatus for a vehicle which can change a display condition to display information for driving in a field of a front view of a vehicle driver.

SUMMARY OF THE INVENTION

How to Attain the Object

In order to attain the objects, a display apparatus for a vehicle according to this invention, which is installed in a dashboard of the vehicle and displays a virtual image of information of the vehicle within a field of front view of a vehicle driver by projecting the information of the vehicle displayed on an image plane of an LCD illuminated by a lighting device on a member of projection disposed at an outside of the dashboard, includes display-size change means for changing a display size on the image plane of the LCD, and illuminating-area change means for changing an illuminating area in accordance with the changed display size interlockingly with said display-size change means.

As mentioned above, the display apparatus for the vehicle is installed in the dashboard of the vehicle and displays the virtual image of information of the vehicle in the front view of the vehicle by projecting the information of the vehicle displayed on the image plane of the LCD illuminated by the lighting device on a member of projection disposed at an outside of the dashboard and includes display-size change means for changing the display size on the image plane of the LCD, and illuminating-area change means for changing an illuminating area in accordance with the changed display size interlockingly with the display-size change means. Therefore, in normal display condition including daytime a small size image can be displayed in high resolution, and in display condition for nighttime a large size image can be displayed in low brightness. Thus, display conditions of information for driving in the field of a front view can be selected.

The display apparatus according to this invention is more specified by that the display-size change means includes a drive circuit for driving the LCD and a display-size change switch connected to the drive circuit for outputting a switching signal for changing the display size of the LCD in the display apparatus mentioned above.

In the display apparatus for a vehicle mentioned above, the display-size change means includes the drive circuit for driving the LCD and the display-size change switch connected to the drive circuit for outputting the switching signal for changing the display size of the LCD so that the display size of the LCD can be changed to a small display size for normal display condition including daytime or to a large display size for nighttime.

The display apparatus according to this invention is more specified by that the illuminating-area change means includes an illuminating-area change switch for outputting a switching signal for changing the illuminating area of the lighting device interlockingly with said display-size change switch in the display apparatus mentioned above.

In the display apparatus for a vehicle mentioned above, the illuminating-area change means includes an illuminating-area change switch for outputting a switching signal for changing the illuminating area of the lighting device interlockingly with said display-size change switch so that the illuminating area of the LCD can be changed in accordance with the display size.

The display apparatus according to this invention is more specified by that the display-size change switch and the illuminating-area change switch interlock a side-lamp switch of the vehicle, and when the side-lamp switch is turned ON, the display-size change means changes the display size of the LCD larger than before, and the illuminating-area change means changes the illuminating area in accordance with the changed display size larger than before in the display apparatus mentioned above.

In the display apparatus for a vehicle mentioned above, the display-size change switch and the illuminating-area change switch interlock a side-lamp switch of the vehicle, and when the side-lamp switch is turned ON, the display-size change means changes the display size of the LCD larger than before, and the illuminating-area change means changes the illuminating area in accordance with the changed display size larger than before so that, by turning the side lamp ON in the nighttime, the large image size for nighttime can be displayed automatically in low brightness.

The display apparatus according to this invention is more specified by that the lighting device includes a back light having a first light source, a reflector for reflecting light from the first light source and a light-guide plate disposed in parallel to the LCD for radiating plane light to the LCD, the plane light being converted from reflected light by the reflector to be entered into the light-guide plate from an edge thereof, and a second light source to be turned ON when the first light source is turned OFF and apply light onto one surface of the light-guide plate to be reflected on the one surface for radiating the reflected light to the LCD, and the illuminating-area change means has a light-guide plate angle change mechanism for changing an angle of the light-guide plate against the LCD to other than in parallel when the second light source is turned ON in the display apparatus mentioned above.

In the display apparatus for a vehicle mentioned above, the lighting device includes the back light and the second light source, the back light having the first light source, the reflector for reflecting light from the first light source and the light-guide plate disposed in parallel to the LCD for radiating plane light to the LCD, the plane light being converted from reflected light by the reflector entered into the edge of the light-guide plate, second light source to be turned ON when the first light source is turned OFF and apply light onto one surface of the light-guide plate to be reflected on the one surface for radiating the reflected light to the LCD, and the illuminating-area change means has the light-guide plate angle change mechanism for changing an angle of the light-guide plate against the LCD to other than in parallel when the second light source is turned ON, so that the illuminating area of the LCD can be changed by using the light-guide plate of the back light.

The display apparatus according to this invention is more specified by that the second light source emits diverging light in the display apparatus mentioned above.

In the display apparatus for a vehicle mentioned above, the second light source emits diverging light so that the reflector can be miniaturized.

The display apparatus according to this invention is more specified by that the light-guide plate angle change mechanism changes the angle of a part of the light-guide plate or the whole thereof against the LCD to other than in parallel in the display apparatus mentioned above.

In the display apparatus for a vehicle mentioned above, the light-guide plate angle change mechanism changes the angle of a part of the light-guide plate or the whole thereof against the LCD to other than in parallel so that the illuminating area can be changed by using a part of the light-guide plate or the whole thereof.

The display apparatus according to this invention is more specified by that the light-guide plate angle change mechanism is provided with a plurality of stays and support walls disposed at the both sides of the light-guide plate, one end of the stay being fixed on a predetermined position of the light-guide plate and the other end of the stay being provided with a support shaft, the guide wall having guide grooves in which support shafts of the plurality of stays are respectively inserted movably for supporting the light-guide plate rotatably in the display apparatus mentioned above.

In the display apparatus for a vehicle mentioned above, the light-guide plate angle change mechanism is provided with the plurality of stays and support walls disposed at the both sides of the light-guide plate, one end of the stay being fixed on the predetermined position of the light-guide plate and the other end of the stay being provided with the support shaft, the guide wall having guide grooves in which support shafts of the plurality of stays are respectively inserted movably for supporting the light-guide plate rotatably so that the light-guide plate angle can be changed smoothly.

The display apparatus according to this invention is more specified by that the light-guide plate is provided on a rear surface thereof with a reflective film in the display apparatus mentioned above.

In the display apparatus for a vehicle mentioned above, the light-guide plate is provided on a rear surface thereof with a reflective film so that the rear surface of the light-guide plate can be used for a reflective surface.

The display apparatus according to this invention is more specified by that the light-guide plate is formed at a partial surface thereof into convex or concave shape in the display mentioned above.

In the display apparatus for a vehicle mentioned above, the light-guide plate is formed at a partial surface thereof into convex or concave shape so that changing the illuminating area can be enhanced.

The display apparatus according to this invention is more specified by that the lighting device includes a light source, a first reflector for reflecting light from the light source and a second reflector having a different size from that of the first reflector for reflecting the light from the light source, and the illuminating-area change means has a reflector change mechanism for changing reflectors to illuminate the LCD at different illuminating area with the reflected light by the first or second reflector which are disposed changeably against the light source in the display apparatus mentioned above.

In the display apparatus for a vehicle mentioned above, the lighting device includes the light source, the first reflector for reflecting the light from the light source and the second reflector having a different size from that of the first reflector for reflecting the light from the light source, and the illuminating-area change means has the reflector change mechanism for changing reflectors to illuminate the LCD at different illuminating area with the reflected light by the first or second reflector which are disposed changeably against the light source so that the illuminating area of the LCD can be changed by using one light source.

The display apparatus according to this invention is more specified by that the reflector change mechanism includes a rack fixed on the first or second reflector, a pinion engaging with the rack and driving means for rotating the pinion in the display apparatus mentioned above.

In the display apparatus for a vehicle mentioned above, the reflector change mechanism includes the rack fixed on the first or second reflector, the pinion engaging with the rack and driving means for rotating the pinion so that the first or second reflector can be changed securely.

The display apparatus according to this invention is more specified by that the lighting device includes a first lighting device and a second lighting device, the first lighting device having a first light source and a first reflector for reflecting light from the first light source toward the LCD for illuminating a part of the LCD, the second lighting device having a second light source and a second reflector for reflecting light from the second light source toward the LCD for illuminating a part of the LCD, and the illuminating-area change means has a radiating direction change mechanism for changing radiating directions of the first and second light sources to separate or superimpose respective illuminating areas on the LCD of the first and second lighting devices in the display apparatus mentioned above.

In the display apparatus for a vehicle mentioned above, the lighting device includes the first lighting device and the second lighting device, the first lighting device having the first light source and the first reflector for reflecting the light from the first light source toward the LCD for illuminating the part of the LCD, the second lighting device having the second light source and the second reflector for reflecting the light from the second light source toward the LCD for illuminating the part of the LCD, and the illuminating-area change means has a radiating direction change mechanism for changing radiating directions of the first and second light sources to separate or superimpose respective illuminating areas on the LCD of the first and second lighting devices so that the illuminating area of the LCD can be changed by separating or superimposing the lights of two lighting devices.

The display apparatus according to this invention is more specified by that the radiating direction change mechanism includes a first gear mounted on the first lighting device, a second gear mounted on the second lighting device and having a same number of teeth as the first gear, a third gear engaging with the first gear, a fourth gear engaging with the second gear and the third gear and having a same number of teeth as the third gear, and driving means for rotating the third or fourth gear in the display apparatus mentioned above.

In the display apparatus for a vehicle mentioned above, the radiating direction change mechanism includes the first gear mounted on the first lighting device, the second gear mounted on the second lighting device and having the same number of teeth as the first gear, the third gear engaging with the first gear, the fourth gear engaging with the second gear and the third gear and having the same number of teeth as the third gear, and driving means for rotating the third or fourth gear so that the radiating directions of two lighting devices can be changed securely so as to separate or superimpose illuminating areas of the LCD by two lighting devices.

The display apparatus according to this invention is more specified by that the lighting device includes a light source and a concave reflector for reflecting light from the light source to the LCD, and the illuminating-area change means has a position change mechanism for changing a relative position between the light source and the concave reflector so as to position the light source on a focal point, or in front or in back of the focal point of the concave reflector in the display apparatus mentioned above.

In the display apparatus for a vehicle mentioned above, the lighting device includes the light source and the concave reflector for reflecting the light from the light source to the LCD, and the illuminating-area change means has the position change mechanism for changing the relative position between the light source and the concave reflector to position the light source on the focal point, or in front or in back of the focal point of the concave reflector so that the illuminating area of the LCD can be changed by using one light source.

The display apparatus according to this invention is more specified by that a lens is disposed between the light source and the LCD in the display apparatus mentioned above.

In the display apparatus for a vehicle mentioned above, the lens is disposed between the light source and the LCD so that changing the illuminating area can be enhanced.

The display apparatus according to this invention is more specified by that the lighting device includes a light source, convex reflector for reflecting light from the light source to the LCD and a concave reflector for reflecting the light from the light source to the LCD, and the illuminating-area change means has a reflector change mechanism for changing reflectors to illuminate the LCD at different illuminating area with the reflected light by the convex or concave reflector which are disposed changeably against the light source in the display apparatus mentioned above.

In the display apparatus for a vehicle mentioned above, the lighting device includes the light source, convex reflector for reflecting the light from the light source to the LCD and the concave reflector for reflecting the light from the light source to the LCD, and the illuminating-area change means has the reflector change mechanism for changing reflectors to illuminate the LCD at different illuminating area with the reflected light by the convex or concave reflector which are disposed changeably against the light source so that the illuminating area of the LCD can be changed by using one light source.

The display apparatus according to this invention is more specified by that the reflector change mechanism includes a stay and a motor, and the convex reflector is fixed on one end of the stay and the concave reflector is fixed on the other end of the stay, and a rotating shaft of the motor is fixed on a middle portion of the stay and the motor rotates the convex reflector or the concave reflector by rotating the stay for changing reflectors between the light source and the LCD in the display apparatus mentioned above.

In the display apparatus for a vehicle mentioned above, the reflector change mechanism includes the stay and the motor, and the convex reflector is fixed on one end of the stay and the concave reflector is fixed on the other end of the stay, and the rotating shaft of the motor is fixed on the middle portion of the stay and the motor rotates the convex reflector or the concave reflector by rotating the stay for changing reflectors between the light source and the LCD so that the convex reflector or the concave reflector can be changed securely.

The above and other objects and features of this invention will become more apparent from the following description taken in conjunction with the accompanying drawings.

BRIEF DESCRIPTION OF THE DRAWINGS

FIG. 4 is a perspective view, showing a first embodiment of the lighting device of the display apparatus for a vehicle in FIG. 1;

FIG. 5 is a perspective view of the lighting device removed a part from the lighting device in FIG. 4;

FIG. 6 is a drawing for explaining operation of the lighting device in FIG. 4;

FIG. 7 is a drawing, showing the other example of a light source of the lighting device in FIG. 4;

FIGS. 8A, 8B are drawings, showing the other examples of the lighting device in FIG. 4;

FIGS. 20A, 20B are perspective views of the lighting device in FIGS. 18A and 18B;

FIGS. 21A, 21B, 21C are drawings, showing a fourth embodiment of the lighting device of the display apparatus for a vehicle in FIG. 1;

DESCRIPTION OF THE PREFERRED EMBODIMENT

Figure 1:
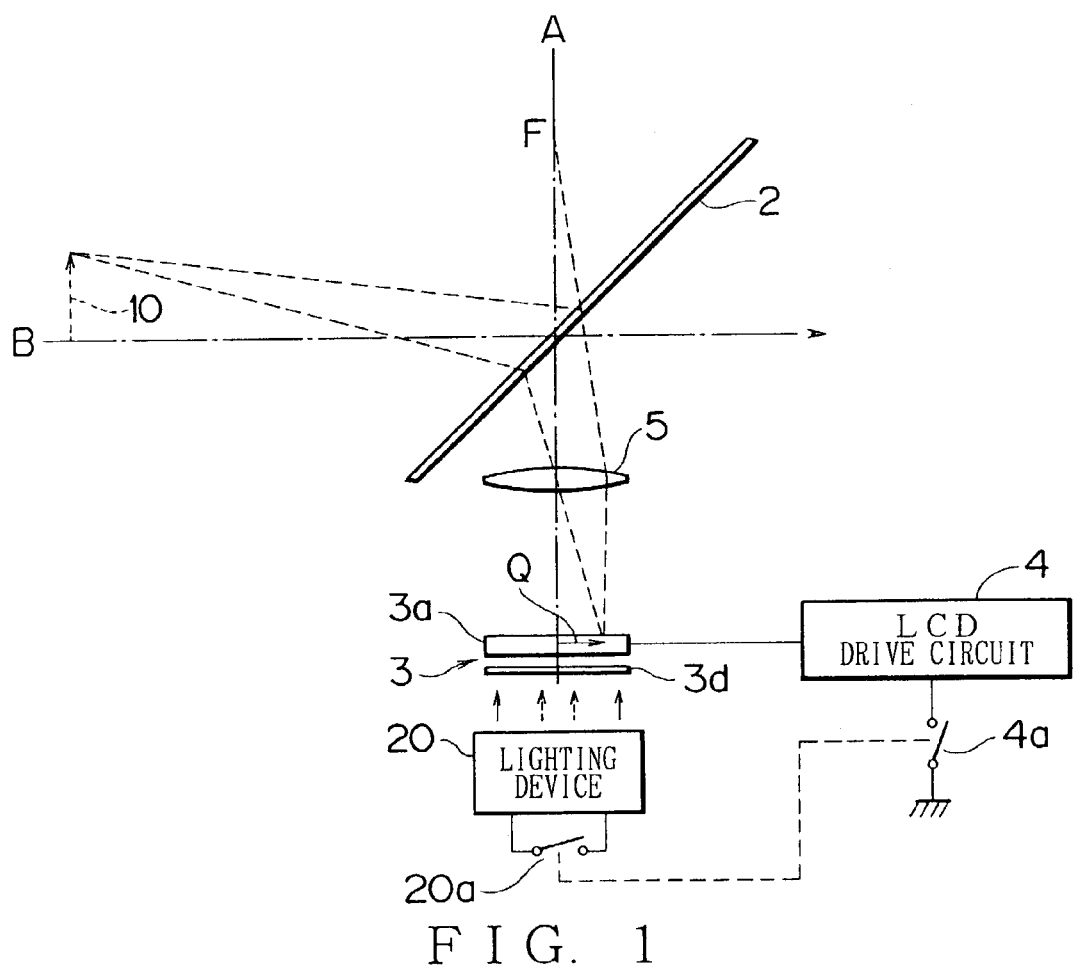
FIG. 1 is a schematic diagram of a display apparatus for a vehicle according to this invention.

An embodiment of a display apparatus for a vehicle according to this invention will be described with reference to drawings. FIG. 1 is a schematic diagram of the embodiment of the display apparatus for the vehicle according to this invention. In FIG. 1, the display apparatus for the vehicle installed in the dashboard (not shown) includes a convex lens 5, an LCD (Liquid Crystal Display) 3, an LCD drive circuit 4 and an illuminating device 20. The LCD 3 is positioned on a focal point of the convex lens 5. The illuminating device 20 is disposed at an opposite side against the convex lens 5 regarding the LCD 3.

The LCD 3 includes a display plate 3a and a light control plate 3d for guiding effectively light from the later-described lighting device 20 and performing as a light diffusion plate to prevent non-uniformity of brightness. The LCD 3 is connected to the LCD drive circuit 4 for performing a part of a display-size change means. The LCD drive circuit is connected to a display-size change switch 4a for performing a part of the display-size change means.

The lighting device 20 for lighting the LCD 3 from behind through the light control plate 3d interlocks the display-size change switch 4a and is connected to a illuminating-area change switch 20a for outputting a illuminating-area change signal to the lighting device 20.

According to the above-mentioned structure, in the daytime, the display-size change switch 4a and the illuminating-area change switch 20a are set OFF, and the LCD drive circuit drives the LCD 3 to display in normal display size, and the lighting device 20 applies high-brightness light through the light control plate 3d in the illuminating area for normal display size in accordance with the normal display size of the LCD 3.

In the nighttime, when the display-size change switch 4a and the illuminating-area change switch 20a are turned ON, the display-size change switch 4a outputs a display-size change signal to the LCD drive circuit 4 so that the LCD drive circuit 4 drives the LCD 3 to display in a display size for night larger than the normal display size. The illuminating-area change switch 20a outputs an illuminating-area change signal to the lighting device 20 so that the lighting device 20 applies low-brightness light through the light control plate 3d in the illuminating area for night in accordance with the display size for night of the LCD 3.

Figure 2:
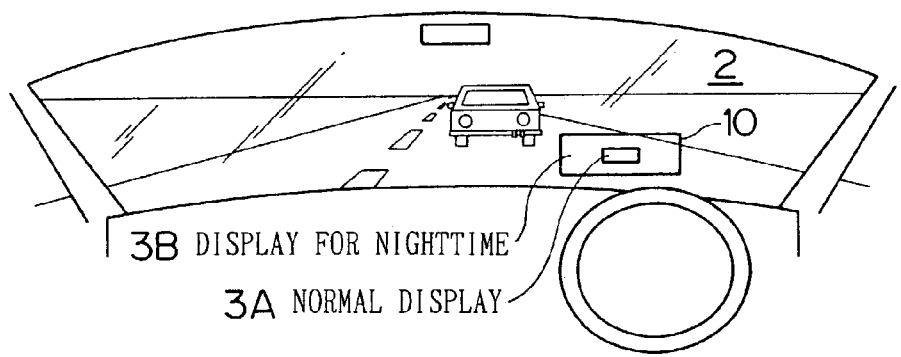
FIG. 2 is an outline drawing to explain an example of display by the display apparatus for the vehicle in FIG. 1.

FIG. 2 is an outline drawing to explain an example of display by the display apparatus for the vehicle in FIG. 1. A normal display 3A having a small display size or a display for night 3B having larger display size than that of the normal display 3A is displayed as a virtual image 10 correspondingly to switching display size of the LCD 3 on the windshield 2 above the dashboard of the vehicle 1.

Figure 3A:
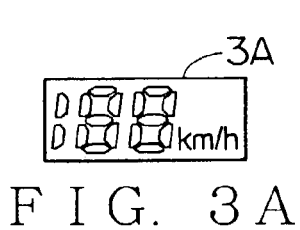
FIG. 3A is a drawing, showing an example of displaying in the daytime.

The normal display 3A is, for example shown in FIG. 3A, display for car speed and is required high brightness to be recognized the display at background brightness of the daylight (sunlight or reflected light of sunlight on a road or a snow ground).

Figure 3B:
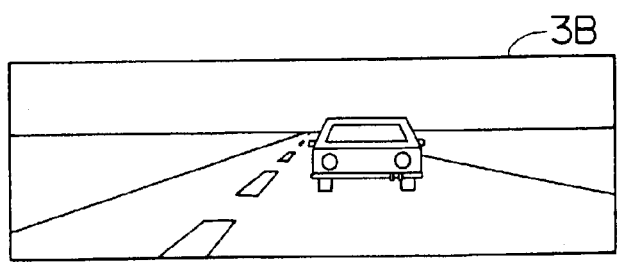
FIG. 3B is a drawing, showing an example of displaying in the nighttime.

The display for night 3B may be displayed in the same display size as the normal display size shown in FIG. 3A by darkening (i.e. reducing the brightness lower than that of normal display) or can be displayed in larger display size than that of the normal display 3A in case of displaying a rear monitor image of an infrared camera as shown in FIG. 3B.

The lighting device 20 is physically structured as following.

FIGS. 4–13 show a first embodiment of the lighting device 20. In FIG. 4, the lighting device 20 includes a back-light 201 having a rod-like light source 201a (white light source such as a cold-cathode tube or a xenon lamp) for applying low brightness light as a first light source, a reflector 201b for reflecting light from the rod-like light source 201a and a light-guide plate 201c disposed in parallel to the LCD 3 for radiating plane light, converted from reflected light by the reflector entered into an edge of the light-guide plate, toward the LCD 3, and a lamp 202 applying high-brightness parallel light as a second light source for radiating reflected light on one surface of the light-guide plate 201c toward the LCD 3. The lamp 202 is a light source for normal display and the back-light 201 is a light source mainly for a display at night. A part 201c1 of the light-guide plate 201c is also used as a reflecting plate for reflecting parallel light from the lamp 202 at normal displaying.

Angle of the part 201c1 of the light-guide plate 201c can be changed to an angle other than in parallel to the LCD 3 by a light-guide plate angle change mechanism as a part of the illuminating-area change means having a plurality of stays 203 and support walls 204 disposed at the both sides of the light-guide plate 201c, one end of the stay 203 being fixed on a predetermined position of the part 201c1 of the light-guide plate 201c and the other end of the stay 203 being provided with a support shaft 203a, the guide wall 204 having guide grooves 204a in which support shafts 203a of the plurality of stays 203 are respectively inserted movably for supporting the part 201c1 of the light-guide plate 201c rotatably.

FIG. 5 is a drawing by removing the support walls 204 in FIG. 4 to see locations of the stays 203 easily.

According to the above structure, in the daytime, the rod-like light source 201a is turned OFF and the lamp 202 is turned ON, and the part 201c1 of the light-guide plate 201c is rotated by the light-guide plate angle change mechanism operated on turning the illuminating-area change switch 20a OFF to a predetermined angle other than in parallel to the LCD 3, as shown in FIG. 6. The high-brightness parallel light of the lamp 202 is reflected on top surface and rear surface of the rotated part 201c1 of the light-guide plate 201c to be used for a reflecting plate, and radiated through the light control plate 3d in illuminating area in accordance with the normal display size on the LCD 3 set by turning the display-size change switch 4a OFF.

In the nighttime, the rod-like light source 201a is turned ON and the lamp 202 is turned OFF, and the part 201c1 of the light-guide plate 201c is rotated toward in parallel to the LCD 3 by the light-guide plate angle change mechanism operated when turning the illuminating-area change switch 20a ON, as shown in FIG. 4. The low-brightness light of the rod-like light source 201a is converted to plane light through the whole of the light-guide plate 201c, and radiated through the light control plate 3d in large illuminating area in accordance with the display size for night on the LCD 3 set by turning the display-size change switch 4a ON.

Light of the lamp 202 can be diffuse light, not parallel light as mentioned above, accordingly to a reflector (not shown) for miniaturizing the reflector, as shown in FIG. 7.

If normal display size of the LCD 3 is smaller than the display size shown in FIG. 6, rotating area for reflecting plate of the light-guide plate 201c may be a part 201c2 (FIGS. 4, 5) smaller than the part 201c1 mentioned above, as shown in FIGS. 8A, 8B. In this case, the lamp 202 and the reflector can be miniaturized more and the lamp 202 can be disposed below the light-guide plate 201c as shown in FIG. 8A or above the light-guide plate 201c as shown in FIG. 8B.

Figure 9:
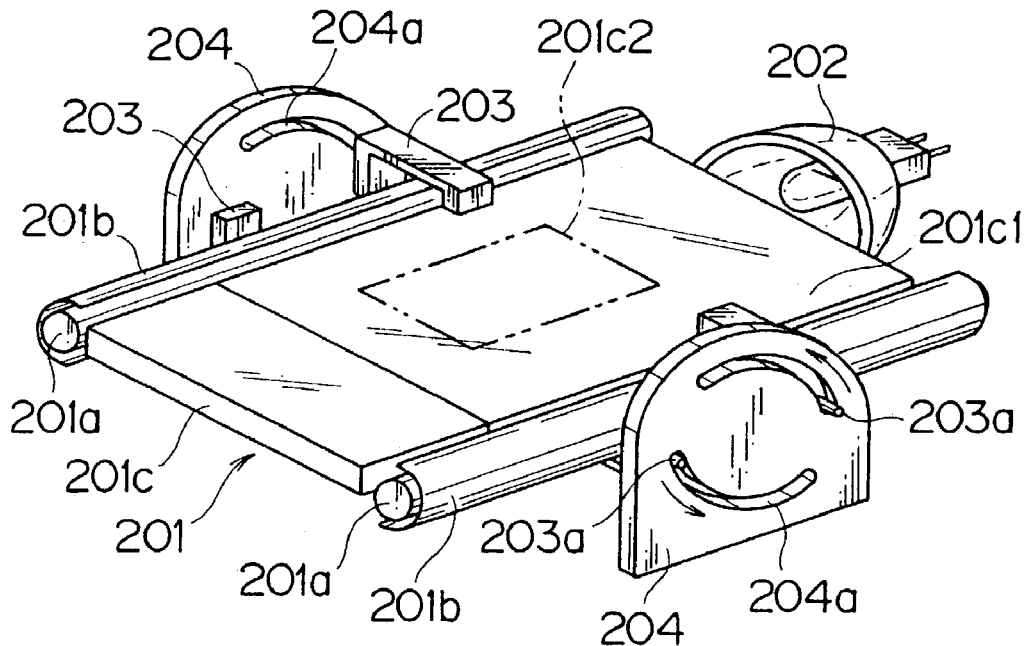
FIG. 9 is a perspective view, showing a further modified example of the lighting device in FIG. 4.

FIG. 9 is a more modified embodiment of the lighting device 20 in FIG. 4. Rear surface of the light-guide plate 201c (opposite surface to a top surface facing to the LCD 3) is coated with reflecting film and the part 201c of the light-guide plate 201c is supported by the light-guide plate angle change mechanism including a plurality of stays 203 and support walls 204 having guide grooves 204a those are modified to rotate counter-clockwise from a position in parallel to the LCD 3.

Figure 10:
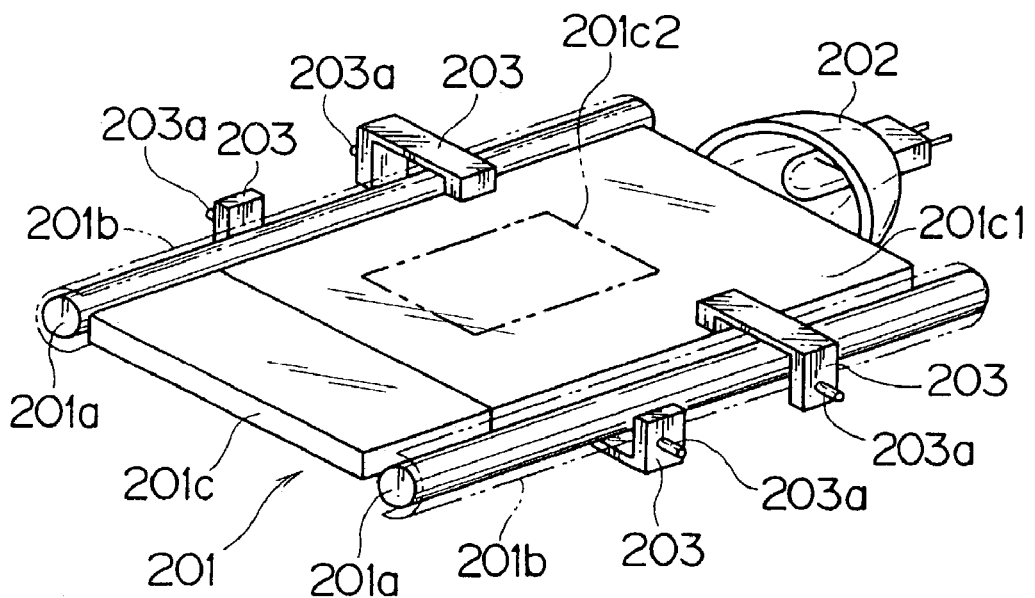
FIG. 10 is a perspective view of the lighting device removed a part from the lighting device in FIG. 9.

FIG. 10 is a drawing by removing the support walls 204 in FIG. 9 to see locations of the stays 203 easily.

Figure 11:
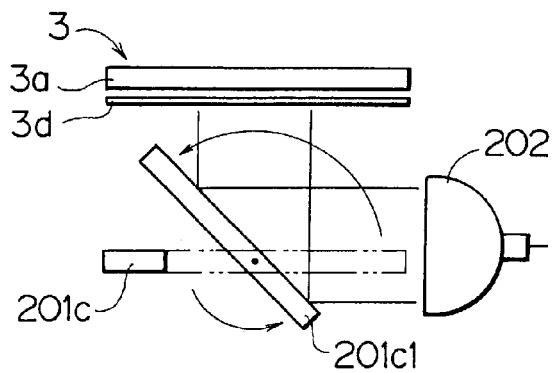
FIG. 11 is a drawing for explaining operation of the lighting device in FIG. 9.

According to the above structure, in the daytime, the rod-like light source 201a is turned OFF and the lamp 202 is turned ON, and the part 201c1 of the light-guide plate 201c is rotated counter-clockwise by the light-guide plate angle change mechanism operated on turning the illuminating-area change switch 20a OFF to a predetermined angle other than in parallel to the LCD 3, as shown in FIG. 11. The high-brightness parallel light of the lamp 202 is reflected on the reflecting film on the rear surface of the rotated part 201c1 of the light-guide plate 201c, and radiated through the light control plate 3d in illuminating area in accordance with the normal display size on the LCD 3 set by turning the display-size change switch 4a OFF.

In the nighttime, the rod-like light source 201a is turned ON and the lamp 202 is turned OFF, and the part 201c1 of the light-guide plate 201c is rotated by the light-guide plate angle change mechanism operated on turning the illuminating-area change switch 20a ON to make the whole of the light-guide plate 201c in parallel to the LCD 3, as shown in FIG. 9. The low-brightness light of the rod-like light source 201a is converted to plane light through the whole of the light-guide plate 201c, and radiated through the light control plate 3d in large illuminating area in accordance with the display size for night on the LCD 3 set by turning the display-size change switch 4a ON.

Figure 12:
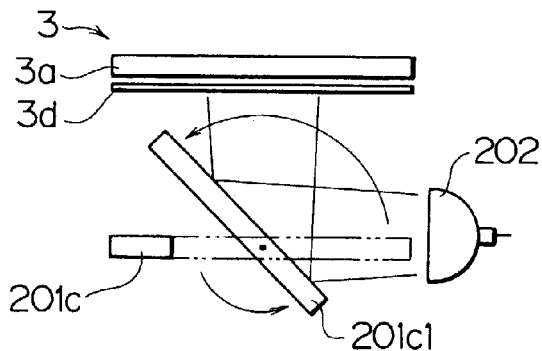
FIG. 12 is a drawing, showing the other example of a light source of the lighting device in FIG. 9.

Light of the lamp 202 can be diffuse light, not parallel light as mentioned above, accordingly to a reflector (not shown) for miniaturizing the reflector, as shown in FIG. 12.

Figure 13:
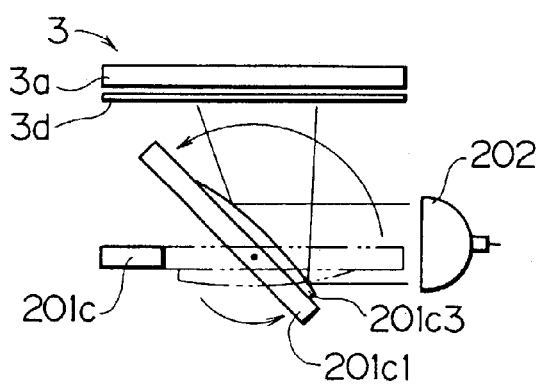
FIG. 13 is a drawing, showing the other example of a light-guide plate of the lighting device in FIG. 9.

By miniaturizing the lamp 202 for radiating parallel light and forming rear surface of the light-guide plate into convex surface 201c3 as shown in FIG. 13, diffuse light converted from the parallel light of the lamp 202 on the convex surface 201c3 may be radiated to the LCD 3.

Figure 14:
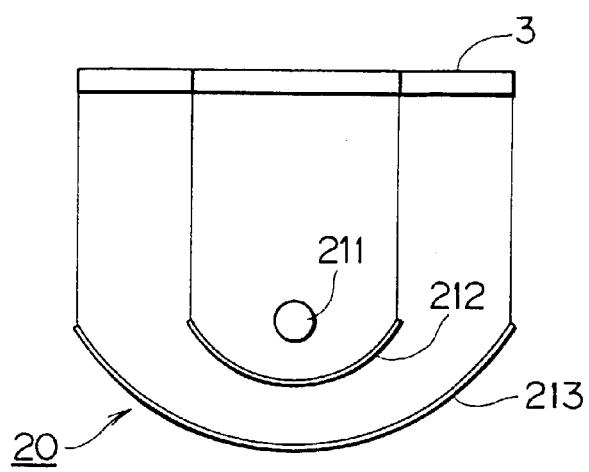
FIG. 14 is a drawing, showing a second embodiment of the lighting device of the display apparatus for a vehicle in FIG. 1.

FIGS. 14–17 show examples according to a second embodiment of the lighting device 20. In FIG. 14, the lighting device 20 includes a lamp 211 as a light source, a first semicylindrical-concave reflector 212 disposed with a predetermined distance from the lamp 211 for reflecting light from the lamp 211 and a second semicylindrical-concave reflector 213 larger than the first reflector 212, disposed with a more distance than that of the first reflector 212 from the lamp 211, for reflecting light from the lamp 211.

Figure 15:
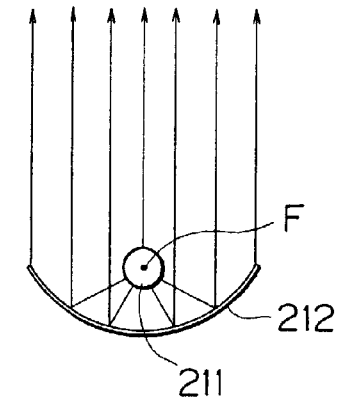
FIG. 15 is a drawing, showing relative position of the light source and the reflector in FIG. 14.

The light of the lamp 211 can be reflected on the first reflector 212 so as to be converted to parallel light by disposing the lamp 211 at a focal point F (or in the vicinity of the focal point F) of the first reflector 212 and the second reflector 213 (not shown in FIG. 15) as shown in FIG. 15. If higher brightness is required, the lamp 211 may be disposed at a far side of the focal point F from the first reflector 212, and if wider illuminating area is required, the lamp 211 may be disposed at a near side of the focal point F to the first reflector 212.

Figure 16A:
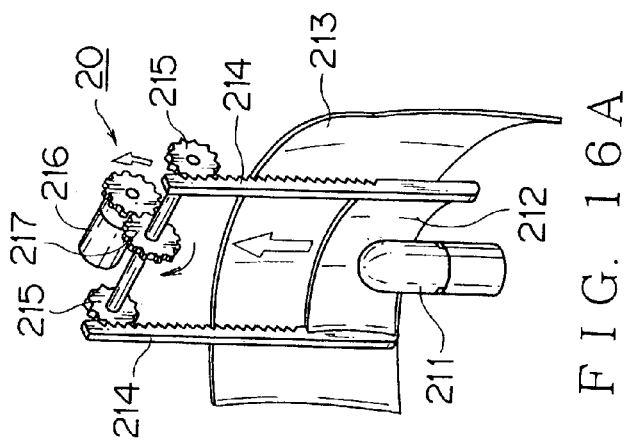
FIGS. 16A, 16B are perspective views of the lighting device in FIG. 14.

The first reflector 212 is mounted on a reflector change mechanism as shown in FIG. 16A. The reflector change mechanism includes a rack 214 fixed on the first reflector 212, a pinion 215 engaging with the rack 214 and driving means having a motor 216 and a gearing portion 217 for rotating the pinion 215.

Figure 16B:
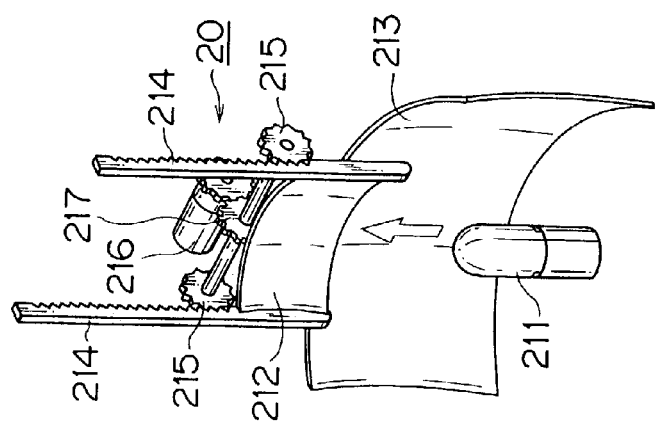

The reflector change mechanism moves the first reflector 212 in a position to reflect the light from the lamp 211 as shown in FIG. 16A, and moves the first reflector 212 from the position to reflect the light from the lamp 211 by the gearing portion 217, the pinion 215 and the rack 214 driven by the motor 216 so as to reflect the light from the lamp 211 on the second reflector 213 instead of the first reflector 212 as shown in FIG. 16B.

Figure 17A:
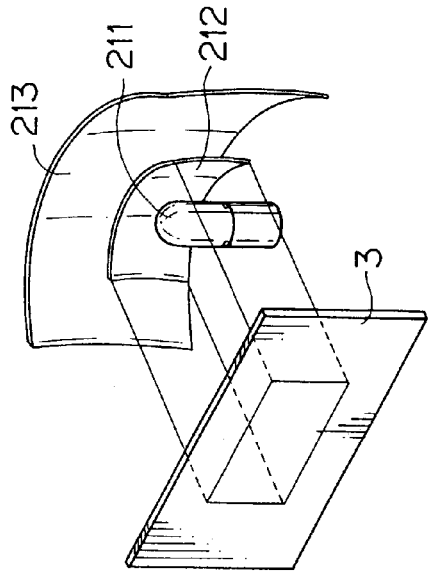
FIGS. 17A, 17B are drawings for explaining operation of the lighting device in FIG. 14.
Figure 17B:
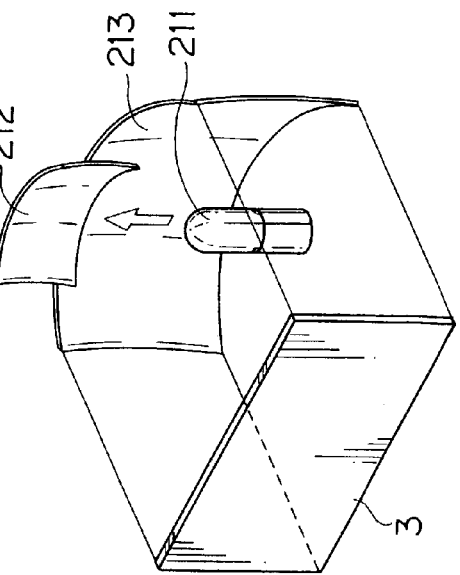

According to the above structure, in the daytime, the first reflector 212 is set in the position to reflect the light from the lamp 211 by the reflector change mechanism operated by turning the illuminating-area change switch 20a OFF as shown in FIG. 17A. The high-brightness light of the lamp 211 reflected on the first reflector 212 is radiated in illuminating area in accordance with the normal display size on the LCD 3 set by turning the display-size change switch 4a OFF.

In the nighttime, image brightness of the LCD 3 can be reduced by means of decreasing input voltage of the lamp 211 by operating a darkening switch (not shown) with keeping the display size and the illuminating area shown in FIG. 17A.

Furthermore, in the nighttime, by moving the first reflector 212 from the position to reflect the light from the lamp 211 by the reflector change mechanism operated by turning the illuminating-area change switch 20a OFF as shown in FIG. 17A, the light of the lamp 211 is reflected on the second reflector 213. The second reflector 213 is farther than the first reflector 212 from the lamp 211 so that brightness of the light of the lamp 211 reflected on the second reflector 213 is reduced lower than the brightness of the case in FIG. 17A and the reflected light is radiated in large illuminating area in accordance with the display size for night on the LCD 3 set by turning the display-size change switch 4a ON.

Figure 18A:
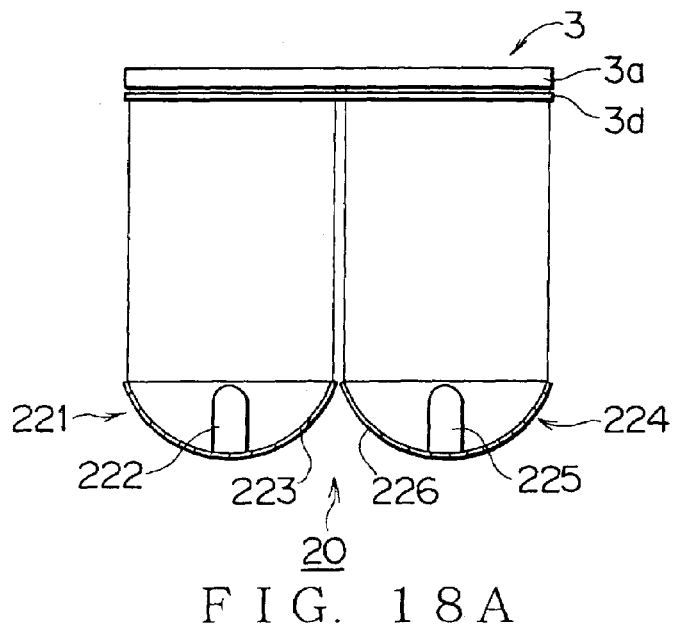
FIGS. 18A, 18B are drawings, showing a third embodiment of the lighting device of the display apparatus for a vehicle in FIG. 1.

FIGS. 18A–20 show examples of the third embodiment of the lighting device 20. In FIG. 18A, the lighting device 20 includes a first light source device 221 and a second light source device 224. The first light source device 221 has a lamp 222 as a first light source and a first spherical concave reflector 223 fixed on the lamp 222 for reflecting the light from the lamp 222 to illuminate a half of the LCD 3. The second light source device 224 has a lamp 225 as a second light source and a second spherical concave reflector 226 fixed on the lamp 225 for reflecting the light from the lamp 225 to illuminate the other half of the LCD 3.

Figure 19:
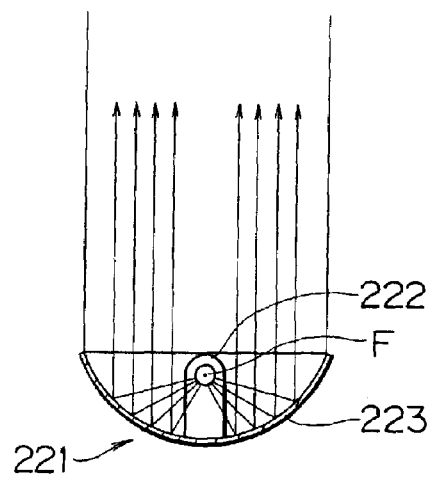
FIG. 19 is a drawing, showing relative position of the light source and the reflector in FIG. 18A or 18B.

The light of the lamp 222 or the lamp 225 can be reflected on the first reflector 223 or the second reflector 226 so as to be converted to parallel light by disposing the lamp 222 or the lamp 225 at a focal point F (or in the vicinity of the focal point F) of the first reflector 223 or the second reflector 226 as shown in FIG. 19. If higher brightness is required, the lamp 222 or the lamp 225 may be disposed at a far side of the focal point F from the first reflector 223 or the second reflector 226, and if wider illuminating area is required, the lamp 222 or the lamp 225 may be disposed at a near side of the focal point F to the first reflector 223 or the second reflector 226.

The first light source device 221 and the second light source device 224 are mounted on a radiating direction change mechanism as shown in FIGS. 20A, 20B. The radiating direction change mechanism includes a first gear 227 mounted rotatably on a predetermined position of the first reflector 223, a second gear 228 mounted rotatably on a predetermined position of the second reflector 226 and having the same number of teeth as the first gear 227, a third gear 229 engaging with the first gear 227, a fourth gear 230 engaging with the second gear 228 and the third gear 229 and having the same number of teeth as the third gear 229, and a motor 231 as driving means for rotating the third gear 229.

The radiating direction change mechanism can adjust a radiating direction of the first light source device 221 and a radiating direction of the second light source device 224 to be in parallel to each other as shown in FIG. 20A, or to intersect each other as shown in FIG. 20B, driven by rotation of the motor 231.

According to the above structure, in the nighttime, the radiating directions of the first light source device 221 and a the second light source device 224 are adjusted to be in parallel to each other as shown in FIG. 18A by the radiating direction change mechanism operated by turning the illuminating-area change switch 20a ON. Thereby, respective illuminating areas are separated so that the first light source device 221 may radiate a half of the LCD 3 and the second light source device 224 may radiate the other half of the LCD 3, and the whole area of the large display size for night of the LCD 3 set by turning the display-size change switch 4a ON is illuminated by low-brightness light.

Figure 18B:
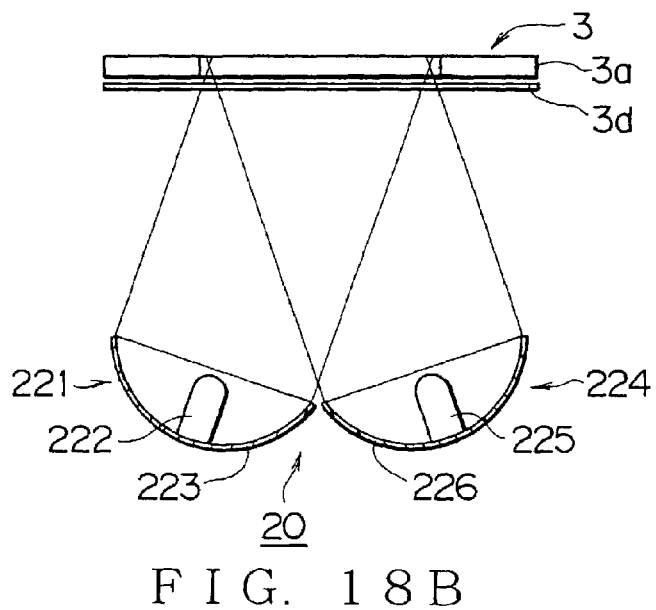

In the daytime, the radiating directions of the first light source device 221 and a the second light source device 224 are adjusted to intersect to each other as shown in FIG. 18B by the radiating direction change mechanism operated by turning the illuminating-area change switch 20a OFF. Thereby, the area of the normal display size of the LCD 3 set by turning the display-size change switch 4a OFF is illuminated by high-brightness light.

FIGS. 21A–25 show examples of the fourth embodiment of the lighting device 20. In FIGS. 21A, 21B, 21C, the lighting device 20 includes a lamp 241 as a light source and a spherical concave reflector 242 disposed with a predetermined distance from the lamp 241 for reflecting light from the lamp 241 toward the LCD 3.

In the lighting device 20, the light of the lamp 241 can be radiated on the illuminating area of the LCD 3 so as to be converted to parallel light by being reflected on the concave reflector 242 when the lamp 241 is disposed at the focal point F of the concave reflector 242, as shown in FIG. 21A.

The light of the lamp 241 can be radiated on the narrower illuminating area of the LCD 3 with higher brightness than that of the case in FIG. 21A when the lamp 241 is disposed at far side of the focal point F from the concave reflector 242, as shown in FIG. 21B.

The light of the lamp 241 can be radiated on the wider illuminating area of the LCD 3 with lower brightness than that of the case in FIG. 21A when the lamp 241 is disposed at near side of the focal point F from the concave reflector 242, as shown in FIG. 21C.

Physically, the concave reflector 242 is fixed on a support device 243 having support posts and a base plate 245, and the lamp 241 is mounted on a relative-position change mechanism (not shown). The relative-position change mechanism can move the lamp 241 from the focal point F of the concave reflector 242 toward far side thereof from the concave reflector 242 (corresponding to FIG. 21B) as shown in FIG. 22A, or from the focal point F of the concave reflector 242 toward near side thereof from the concave reflector 242 (corresponding to FIG. 21C) as shown in FIG. 22B.

Figure 22A:
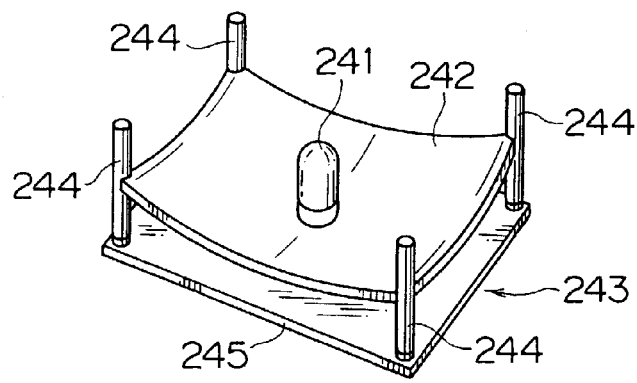
FIGS. 22A, 22B are perspective views of the lighting device in FIGS. 21A, 21B.
Figure 22B:
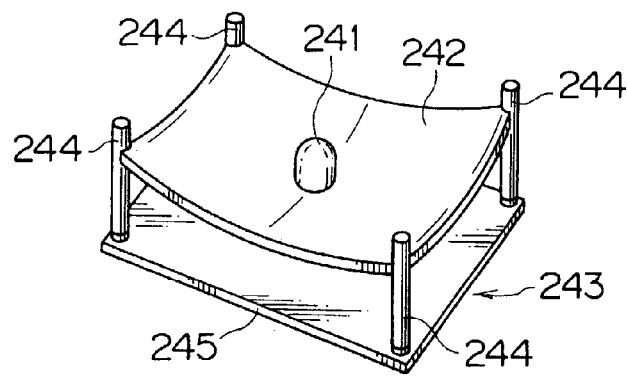

When a relative position of the lamp 241 and the concave reflector 242 is set as shown in FIG. 21B and FIG. 22A, the display size of the LCD 3 is set in a small size for normal displaying including daytime displaying. When a relative position of the lamp 241 and the concave reflector 242 is set as shown in FIG. 21C and FIG. 22B, the display size of the LCD 3 is set in a large size for nighttime displaying. Thereby, in normal displaying, high-brightness light is radiated in small illuminating area in accordance with the small display size of the LCD 3, and in nighttime displaying, low-brightness light is radiated in large illuminating area in accordance with the large display size of the LCD 3.

Figure 23A:
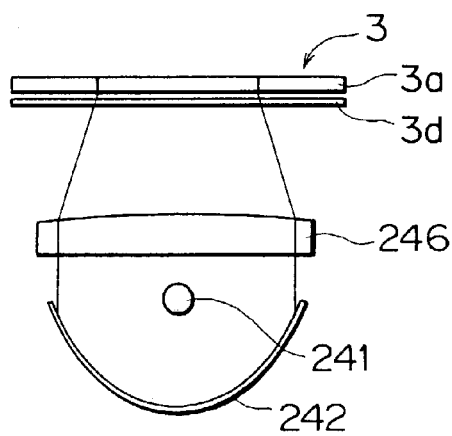
FIGS. 23A, 23B are drawings, showing the other examples of the lighting device in FIGS. 21A, 21B.
Figure 23B:
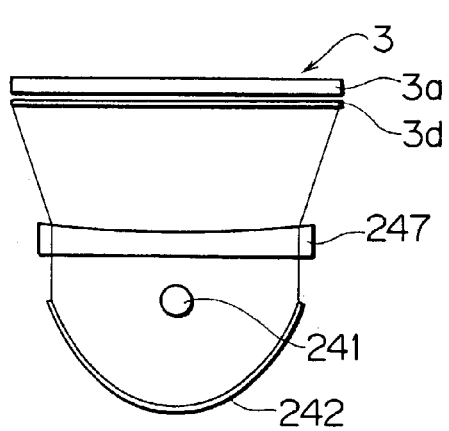

As shown in FIGS. 23A and 23B, it may be preferable that the lamp 241 is fixed at the focal point F of the concave reflector 242 and a lens is disposed between the lamp 241 and the LCD 3.

FIG. 23A shows an embodiment of disposing a convex lens 246 between the lamp 241 and the LCD 3. The light of the lamp 241 reflected on the concave reflector 242 is condensed by the convex lens 246 so as to be radiated in a small display size of the LCD 3 with high brightness, so that it is suitable for normal displaying including daytime displaying.

FIG. 23B shows an embodiment of disposing a concave lens 247 between the lamp 241 and the LCD 3. The light of the lamp 241 reflected on the concave reflector 242 is diffused by the concave lens 247 so as to be radiated in a large display size of the LCD 3 with low brightness, so that it is suitable for nighttime displaying.

Figure 24:
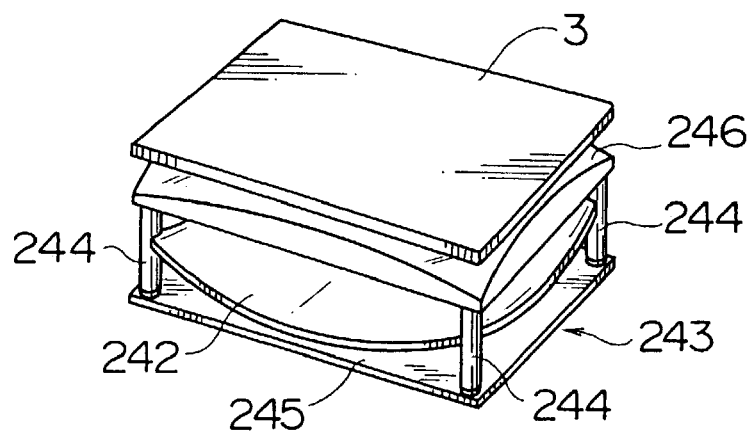
FIG. 24 is a schematic perspective view of the lighting device in FIG. 23A.
Figure 25:
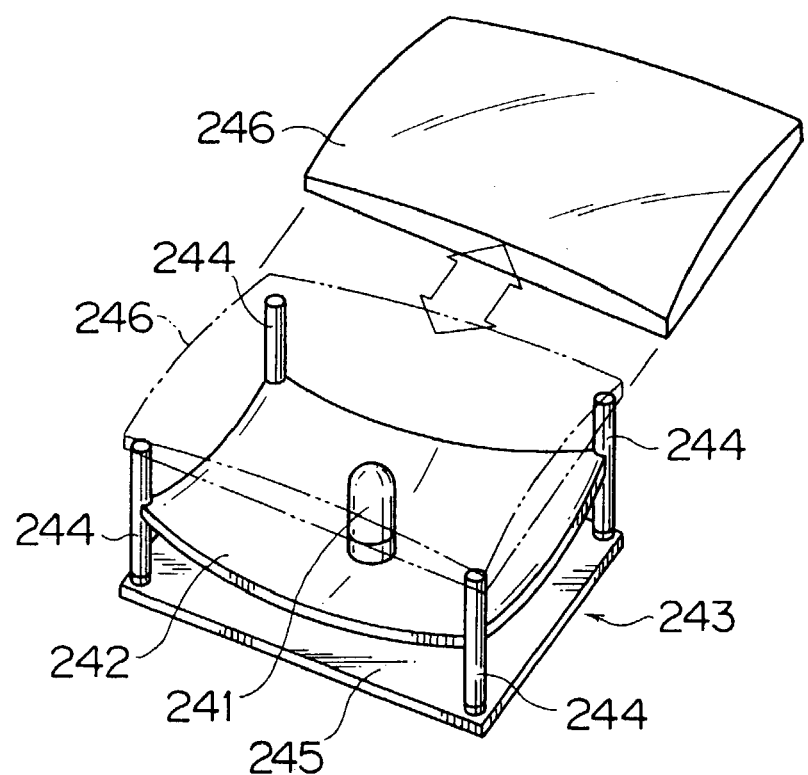
FIG. 25 is a schematic perspective view for explaining operation of mounting and dismounting a lens of the lighting device in FIG. 24.

FIG. 24 shows a schematic perspective view of the lighting device 20 in which the lens 246 or 247 is disposed between the lamp 241 and the LCD 3.

FIG. 24 shows a schematic perspective view of the lighting device 20 in which the lens 246 or 247 is mounted or dismounted between the lamp 241 and the LCD 3.

Figure 26A:
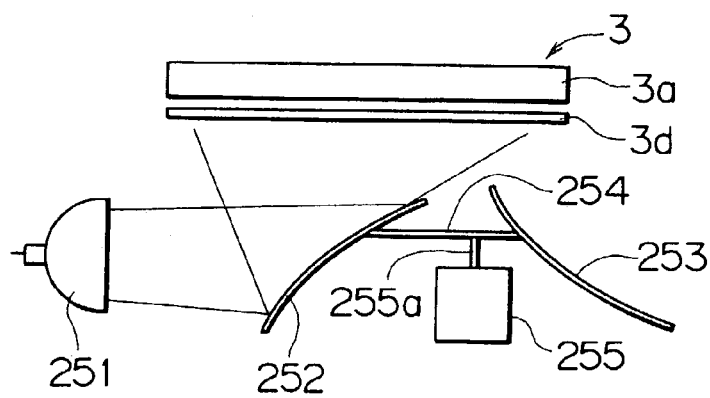
FIGS. 26A, 26B are drawings, showing a fifth embodiment of the lighting device of the display apparatus for a vehicle in FIG. 1.
Figure 26B:
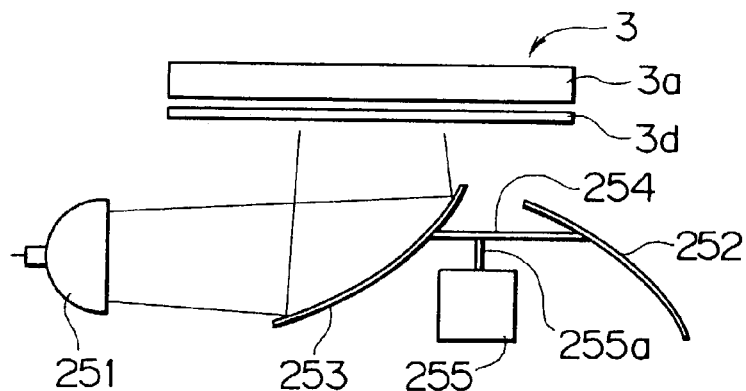
Figure 28:
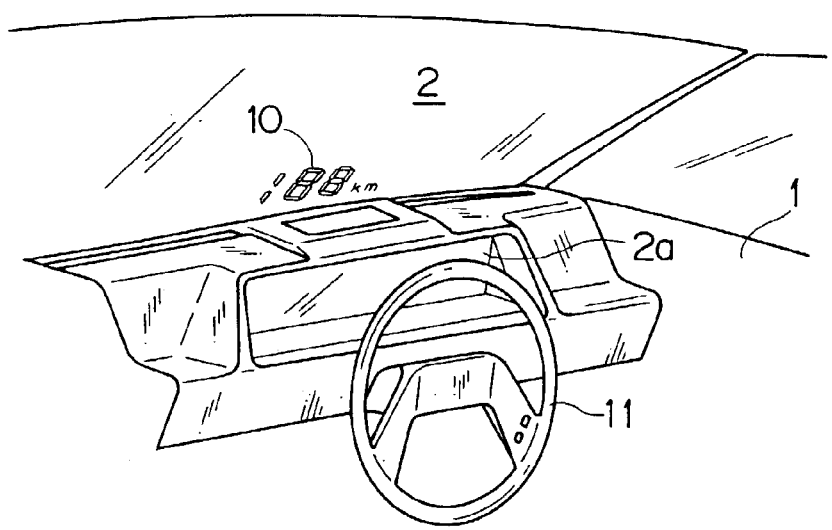
FIG. 28 is an outline drawing of a usual display apparatus for the vehicle.

FIGS. 26A, 26B, 27A and 27B show an example of the fifth embodiment of the lighting device 20. In FIGS. 26A, 26B, the lighting device 20 includes a lamp 251 as a light source, a semi-cylindrical convex reflector 252 for reflecting light from the lamp 251 and a semi-cylindrical concave reflector 253 for reflecting the light from the lamp 251.

The convex reflector 252 and the concave reflector 253 are mounted on a reflector change mechanism having a stay 254 and a motor 255 whose rotating shaft 255a is fixed on the middle of the stay 254, at one end of which the convex reflector 252 is fixed and at the other end thereof the concave reflector 253 is fixed.

When the convex reflector 252 is set in a position for reflecting the light from the lamp 251 by rotation drive of the motor 255 of the reflector change mechanism, the light of the lamp 251 diffused by the convex reflector 252 is radiated on a large illuminating area of the LCD 3 with low brightness, as shown in FIG. 26A.

When the concave reflector 253 is set in a position for reflecting the light from the lamp 251 to be changed from the convex reflector 252 by rotation drive of the motor 255 of the reflector change mechanism, the light of the lamp 251 condensed by the concave reflector 253 is radiated on a small illuminating area of the LCD 3 with high brightness, as shown in FIG. 26B.

Figure 27A:
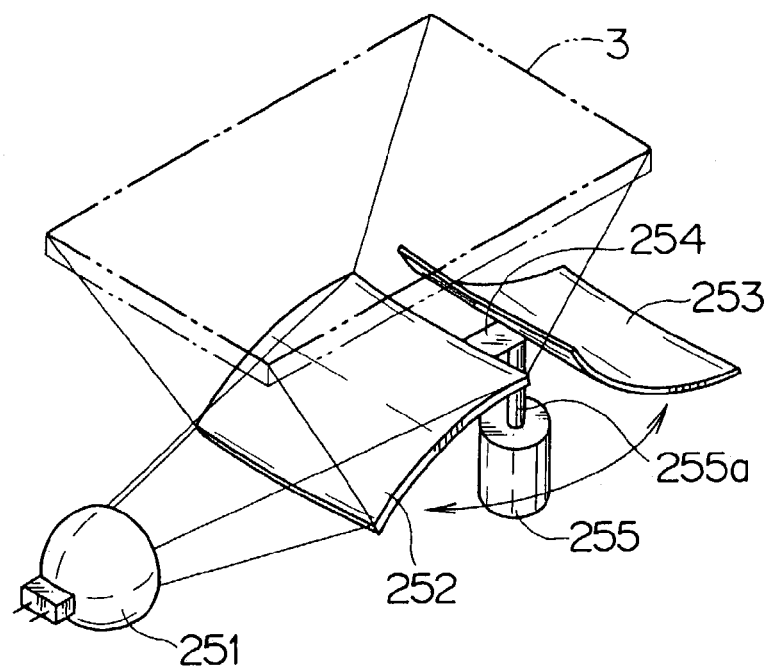
FIGS. 27A, 27B are schematic perspective views of the lighting devices in FIGS. 26A, 26B.
Figure 27B:
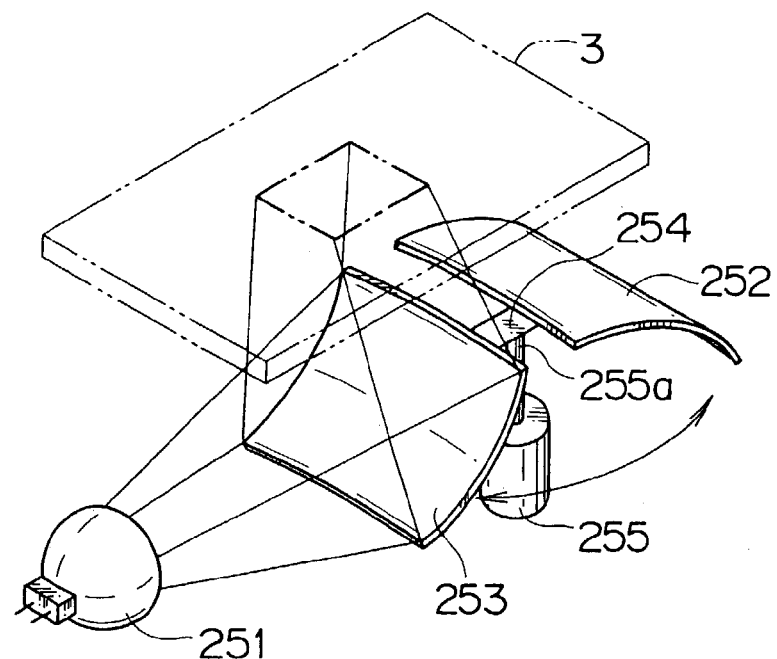
Figure 29:
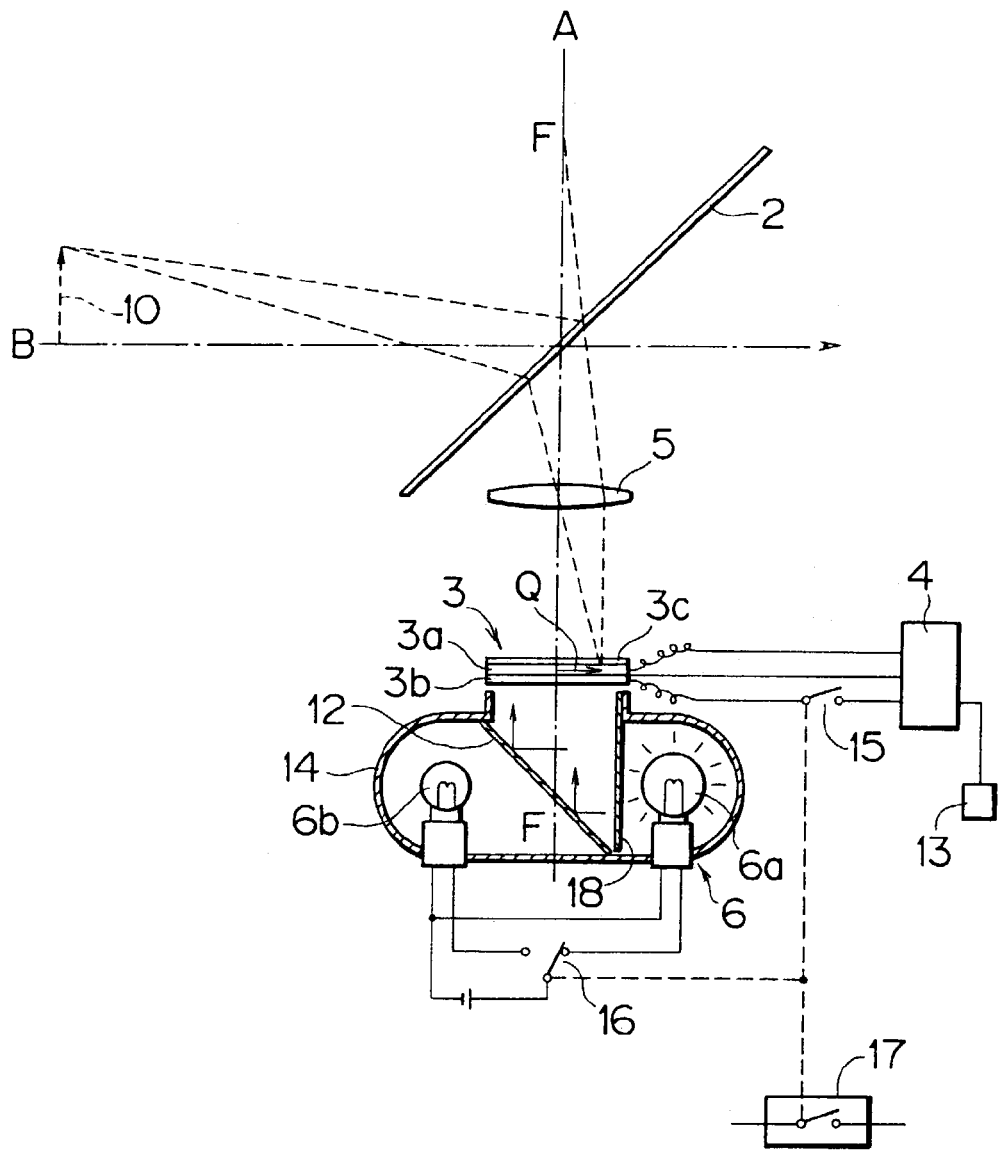
FIG. 29 is a whole diagram of a usual display apparatus for a vehicle.
Figure 30A:
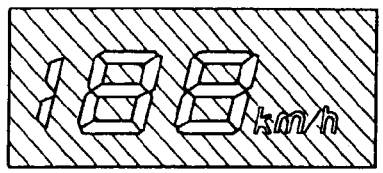
FIGS. 30A, 30B are drawings, showing examples of display by the usual display apparatus for the vehicle.
Figure 30B:

FIGS. 27A and 27B are schematic perspective views respectively corresponding to FIGS. 26A and 26B.

According to the above structure, in the nighttime, the convex reflector 252 is selected by the reflector change mechanism operated by turning the illuminating-area change switch 20a ON, as shown in FIGS. 26A and 27A. Thereby, the light of the lamp 251 reflected by the convex reflector 252 is radiated with low brightness in the whole area of the large display size for night on the LCD 3 set by turning the display-size change switch 4a ON.

In the daytime, the concave reflector 253 is selected by the reflector change mechanism operated by turning the illuminating-area change switch 20a OFF, as shown in FIGS. 26B and 27B. Thereby, the light of the lamp 251 reflected by the concave reflector 253 is radiated with high brightness in the small area of the normal display size on the LCD 3 set by turning the display-size change switch 4a OFF.

The embodiments of this invention have been described as mentioned above, however, this invention is not limited in above, and various modification and applications can be considered.

For example, a display image of the LCD 3 is projected on the windshield 2 in FIG. 1. Instead of this, the display image may be projected on a combiner disposed on the dashboard.

In FIG. 1, the display-size change switch 4a and the illuminating-area change switch 20a are interlocked. The both switches may be interlocked with the side lamp switch. Physically, when the side lamp switch is turned OFF, the display-size change switch 4a and the illuminating-area change switch 20a are turned OFF interlockingly, and when the side lamp switch is turned ON, the display-size change switch 4a and the illuminating-area change switch 20a are turned ON interlockingly. For other example, the display-size change switch 4a and the illuminating-area change switch 20a may be turned ON/OFF by a signal of a light sensor.

In the example of FIG. 4, the angle of the part 201c1 of the light-guide plate 201c is changed. An angle of the whole of the light-guide plate 201c may be changed.

In the example of FIG. 13, the rear surface of the light-guide plate 201c is formed into the convex surface 201c3. Instead of the convex surface, the rear surface may be formed into a concave surface.

In the example of FIG. 16A, the first reflector 212 is mounted on the reflector change mechanism including a rack 214 fixed on the first reflector 212, a pinion 215 and driving means having a motor 216 and a gearing portion 217 and the second reflector 213 is fixed. Instead of this, the second reflector 213 may be mounted on a reflector change mechanism having similar structure as mentioned above, and the first reflector 212 and the second reflector 213 may be changed alternately in a position to reflect the light from the lamp 211 toward the LCD 3.

In the example of FIG. 20A, the third gear 229 is driven rotatively by the motor 231 as driving means. Instead of this, the fourth gear 230 may be driven rotatively by the motor 231.

Although the present invention has been fully described by way of examples with reference to the accompanying drawings, it is to be noted that various change and modifications can be made with the scope of the present invention.

What is claimed is:

1. A display apparatus for a vehicle, which is installed in a dashboard of the vehicle and displays a virtual image of information of the vehicle within a field of front view of a vehicle driver by projecting the information of the vehicle displayed on an image plane of an LCD illuminated by a lighting device on a member of projection disposed at an outside of the dashboard, comprising:

display-size change means for changing a display size on the image plane of the LCD; and illuminating-area change means for changing an illuminating area in accordance with the changed display size interlockingly with said display-size change means;

wherein the lighting device includes a back light having a first light source, a reflector for reflecting light from the first light source and a light-guide plate disposed in parallel to the LCD for radiating plane light to the LCD, the plane light being converted from reflected light by the reflector to be entered into the light-guide plate from an edge thereof, and a second light source to be turned ON when the first light source is turned OFF and apply light onto one surface of the light-guide plate to be reflected on the one surface for illuminating the LCD, wherein the illuminating-area change means has a light-guide plate angle change mechanism for changing an angle of the light-guide plate against the LCD to other than in parallel when the second light source is turned ON.

2. The display apparatus for a vehicle according to claim 1, wherein the display-size change means includes a drive circuit for driving the LCD and a display-size change switch connected to the drive circuit for outputting a switching signal for changing the display size of the LCD.

3. The display apparatus according to claim 1 or 2, wherein the second light source emits diverging light.

4. The display apparatus according to claim 1 or 2, wherein the light-guide plate angle change mechanism changes the angle of a part of the light-guide plate or the whole thereof against the LCD to other than in parallel.

5. The display apparatus according to claim 4, wherein the light-guide plate angle change mechanism is provided with a plurality of stays and support walls disposed at the both sides of the light-guide plate, whereby one end of the stay is fixed on a predetermined position of the light-guide plate and the other end of the stay is provided with a support shaft, whereby the support wall has guide grooves in which support shafts of the plurality of stays are respectively inserted movably for supporting the light-guide plate rotatably.

6. The display apparatus according to claim 4, wherein the light-guide plate is provided on a rear surface thereof with a reflective film.

7. The display apparatus according to claim 4, wherein the light-guide plate is formed at a partial surface thereof into convex or concave shape.

8. A display apparatus for a vehicle, which is installed in a dashboard of the vehicle and displays a virtual image of information of the vehicle within a field of front view of a vehicle driver by projecting the information of the vehicle displayed on an image plane of an LCD illuminated by a lighting device on a member of projection disposed at an outside of the dashboard, comprising:

display-size change means for changing a display size on the image plane of the LCD; and illuminating-area change means for changing an illuminating area in accordance with the changed display size interlockingly with said display-size change means;

wherein the lighting device includes a light source, a first reflector for reflecting light from the light source and a second reflector having a different size from that of the first reflector for reflecting the light from the light source, wherein the illuminating-area change means has a reflector change mechanism for changing reflectors to illuminate respectively different illuminating area of the LCD with the reflected light by the first or second reflector which are disposed changeably against the light source.

9. The display apparatus for a vehicle according to claim 8, wherein the display-size change means includes a drive circuit for driving the LCD and a display-size change switch connected to the drive circuit for outputting a switching signal for changing the display size of the LCD.

10. The display apparatus according to claim 8 or 9, wherein the reflector change mechanism includes a rack fixed on the first or second reflector, a pinion engaging with the rack and driving means for rotating the pinion.

11. A display apparatus for a vehicle, which is installed in a dashboard of the vehicle and displays a virtual image of information of the vehicle within a field of front view of a vehicle driver by projecting the information of the vehicle displayed on an image plane of an LCD illuminated by a lighting device on a member of projection disposed at an outside of the dashboard, comprising:

display-size change means for changing a display size on the image plane of the LCD; and illuminating-area change means for changing an illuminating area in accordance with the changed display size interlockingly with said display-size change means;

wherein the lighting device includes a first lighting device and a second lighting device, the first lighting device having a first light source and a first reflector for reflecting light from the first light source toward the LCD for illuminating a part of the LCD, the second lighting device having a second light source and a second reflector for reflecting light from the second light source toward the LCD for illuminating a part of the LCD, wherein the illuminating-area change means has a radiating direction change mechanism for changing radiating directions of the first and second light sources to separate or superimpose respective illuminating areas on the LCD of the first and second lighting devices.

12. The display apparatus for a vehicle according to claim 11, wherein the display-size change means includes a drive circuit for driving the LCD and a display-size change switch connected to the drive circuit for outputting a switching signal for changing the display size of the LCD.

13. The display apparatus according to claim 11 or 12, wherein the radiating direction change mechanism includes a first gear mounted on the first lighting device, a second gear mounted on the second lighting device and having a same number of teeth as the first gear, a third gear engaging with the first gear, a fourth gear engaging with the second gear and the third gear and having a same number of teeth as the third gear, and driving means for rotating the third or fourth gear.

14. A display apparatus for a vehicle, which is installed in a dashboard of the vehicle and displays a virtual image of information of the vehicle within a field of front view of a vehicle driver by projecting the information of the vehicle displayed on an image plane of an LCD illuminated by a lighting device on a member of projection disposed at an outside of the dashboard, comprising:

display-size change means for changing a display size on the image plane of the LCD; and illuminating-area change means for changing an illuminating area in accordance with the changed display size interlockingly with said display-size change means;

wherein the lighting device includes a light source and a concave reflector for reflecting light from the light source to the LCD, wherein the illuminating-area change means has a position change mechanism for changing a relative position between the light source and the concave reflector so as to position the light source on a focal point, or in front or in back of the focal point of the concave reflector.

15. The display apparatus for a vehicle according to claim 14, wherein the display-size change means includes a drive circuit for driving the LCD and a display-size change switch connected to the drive circuit for outputting a switching signal for changing the display size of the LCD.

16. The display apparatus according to claim 14 or 15, wherein a lens is disposed between the light source and the LCD.

17. A display apparatus for a vehicle, which is installed in a dashboard of the vehicle and displays a virtual image of information of the vehicle within a field of front view of a vehicle driver by projecting the information of the vehicle displayed on an image plane of an LCD illuminated by a lighting device on a member of projection disposed at an outside of the dashboard, comprising:

display-size change means for changing a display size on the image plane of the LCD; and illuminating-area change means for changing an illuminating area in accordance with the changed display size interlockingly with said display-size change means;

wherein the lighting device includes a light source, a convex reflector for reflecting light from the light source to the LCD and a concave reflector for reflecting light from the light source to the LCD, wherein the illuminating-area change means has a reflector change mechanism for changing reflectors to illuminate the LCD at different illuminating area with the reflected light by the convex or concave reflector which are disposed changeably against the light source.

18. The display apparatus for a vehicle according to claim 17, wherein the display-size change means includes a drive circuit for driving the LCD and a display-size change switch connected to the drive circuit for outputting a switching signal for changing the display size of the LCD.

19. The display apparatus according to claim 17 or 18, wherein the reflector change mechanism includes a stay and a motor, whereby the convex reflector is fixed on one end of the stay and the concave reflector is fixed on the other end of the stay, whereby a rotating shaft of the motor is fixed on a middle portion of the stay and the motor rotates the convex reflector or the concave reflector by rotating the stay for changing reflectors between the light source and the LCD.

* * * * *